United States Patent [19]
Katz

[11] 3,909,206
[45] Sept. 30, 1975

[54] HIGH PERFORMANCE CARBON DIOXIDE SCRUBBER

[75] Inventor: Murray Katz, Newington, Conn.

[73] Assignee: United Technologies Corporation, Hartford, Conn.

[22] Filed: Apr. 10, 1974

[21] Appl. No.: 459,733

[52] U.S. Cl. .................. 23/284; 23/281; 55/68; 252/384; 423/230

[51] Int. Cl.² ... B01J 1/22; B01J 7/00; B01D 53/16; C01B 31/20

[58] Field of Search ............... 23/281, 284; 55/68; 252/384; 423/230, 234

[56] References Cited
UNITED STATES PATENTS

| | | | |
|---|---|---|---|
| 2,091,202 | 8/1937 | Hallock et al. ............... | 252/384 X |
| 2,865,720 | 12/1958 | Guild ............................. | 23/284 |
| 3,301,636 | 1/1967 | Otrhalek ...................... | 252/384 X |
| 3,838,064 | 9/1974 | Vogt et al. ................... | 252/384 |
| 3,847,837 | 11/1974 | Boryta .......................... | 423/230 X |
| 3,865,924 | 2/1975 | Gidaspow ..................... | 23/284 X |

FOREIGN PATENTS OR APPLICATIONS

| | | | |
|---|---|---|---|
| 654,869 | 12/1962 | Canada .......................... | 55/68 |

Primary Examiner—Morris O. Wolk
Assistant Examiner—Roger F. Phillips
Attorney, Agent, or Firm—Melvin P. Williams; Stephen E. Revis

[57] ABSTRACT

A scrubber uses finely ground alkali hydroxide particles mixed with fine particles of a hydrophobic material such as polytetrafluoroethylene, for removing carbon dioxide from a gas stream to a concentration of less than one-quarter of a part per million.

3 Claims, 1 Drawing Figure

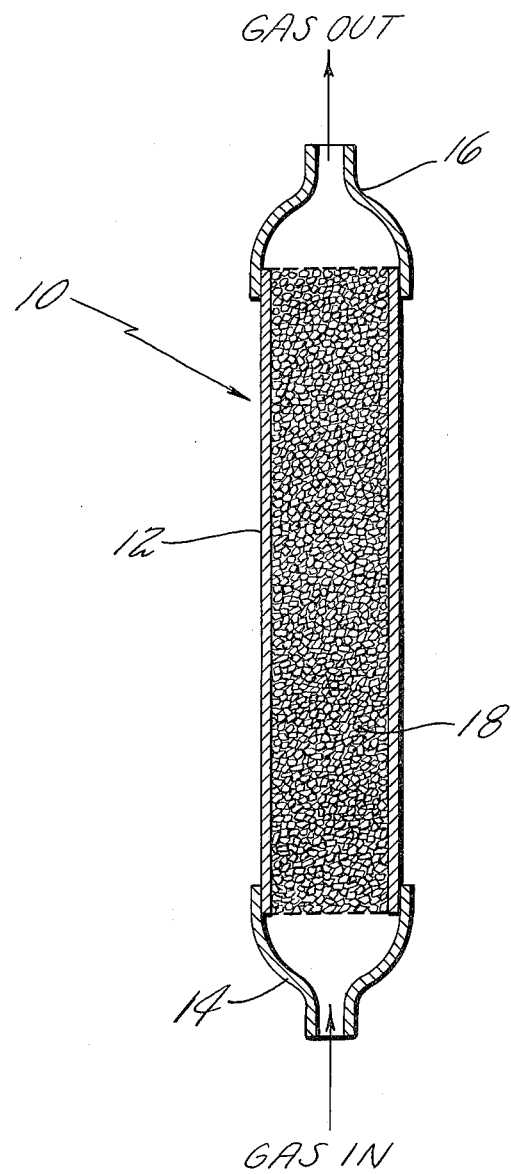

HIGH PERFORMANCE CARBON DIOXIDE SCRUBBER

BACKGROUND OF THE INVENTION

1. Field of Invention

This invention relates to scrubbers, and more particularly to scrubbers for removing carbon dioxde from a gas supply.

2. Description of the Prior Art

Alkali electrolyte fuel cells require a clean fuel and a clean oxidant to generate power. Many oxidants, such as air and all but the most pure and therefore the most expensive oxygen supplies, and some fuel contain carbon dioxide which, when brought into contact with the electrolyte of the fuel cell, combine with the electrolyte to form carbonates. The formation and presence of carbonates in the electrolyte decreases the voltage of the cells and eventually causes cell failure. In fact, a concentration in the inlet gas stream of only one part per million may cause an alkali electrolyte fuel cell to have unacceptable performance within a thousand hours. Because of this, even though alkali electrolyte fuel cells have greater efficiencies than acid electrolyte fuel cells, alkali electrolyte fuel cells are not utilized in the commercial market because of their intolerance to the carbon dioxide in the available oxidant, air. It is therefore advantageous to remove most of the carbon dioxide from the incoming oxidant stream of the alkali electrolyte fuel cell, which is accomplished in a scrubber. In prior art scrubbers, particles are placed in a bed through which the carbon dioxide-containing gas is passed. Such scrubbers use particles of soda lime or other alkali hydroxides with particle sizes of approximately 2500 microns or above and do not remove carbon dioxide to a concentration of less than one part per million — even with the use of long beds.

Prior art scrubbers also can be irreversibly damaged by water in the incoming gas stream since the water softens the surfaces of the alkali hydroxide particles and they mass together, decreasing the performance of the devices, and therefore highly efficient humidity removal devices are required upstream of the scrubbers. However, suitable water removal devices are either extremely expensive (eg., condensers) or use consumable materials that need to be replaced (eg., silica gel beds).

SUMMARY OF INVENTION

An object of the present invention is to provide a scrubber that removes carbon dioxide from a gas stream to concentrations of below one part per million.

Another object of the present invention is to provide a carbon dioxide removal device that is less sensitive to water in the gas stream.

According to the present invention, a scrubber capable of removing carbon dioxide in a gas stream to a concentration of less than one quarter of a part per million uses a packed bed of alkali hydroxide material with particle sizes of up to ten microns mixed with particles of an inert material of a similar or smaller size.

The present invention permits use of very small particles of alkali hydroxides to remove carbon dioxide down to concentrations of less than one-quarter of a part per million by combining these particles with very small particles of an inert material to maintain scrubber particle separation. The invention thus overcomes the greater tendency of extremely small scrubber particles to cake together into larger particles as a result of water in the gas stream.

The foregoing and other objects, features and advantages of the present invention will become more apparent in light of the following detailed description of preferred embodiments thereof as illustrated in the accompanying drawing.

BRIEF DESCRIPTION OF THE DRAWING

The sole FIGURE is a sectional view of a carbon dioxide scrubber according to the present invention.

DESCRIPTION OF THE PREFERRED EMBODIMENTS

In a scrubber, carbon dioxide is removed from a gas stream such as oxygen, by reacting with the solid alkali hydroxide particles (such as NaOH) in a container to form carbonates (such as $NaCO_3$). The operation of the device relies on the carbon dioxide molecules coming into contact with the hydroxide particles of the packed bed. The scrubber material may be any alkali hydroxide, such as sodium hydroxide, potassium hydroxide, calcium hydroxide or lithium hydroxide. Such alkali hydroxides are commercially available in particle sizes of approximately 2500 microns or greater. For example, sodium hydroxide may be obtained under the tradename of Indicarb from Fisher Scientific in Pittsburgh, Pa. To achieve particle sizes commensurate with the present invention, the large particles (2500 microns or more) may be finely divided by such conventional methods as ball milling or fluid energy milling, or by any other suitable known means, to a particle size range of less than 10 microns. A material inert to water, such as polytetrafluoroethylene, in a similar size range is mixed with the finely divided alkali hydroxide particles in a proportion of from 40 to 60% by volume, or as little as 10% by volume if a relatively dry gas source is to be scrubbed. Fine polytetrafluoroethylene (Teflon) particles of a suitable size are widely available in the market. The particles are well mixed to provide a substantially uniform distribution of the different particles. Referring now to the FIGURE, a carbon dioxide scrubber is shown in simplified form and is generally designated by the numeral 10. The scrubber 10 comprises a cylindrical container 12 having gas inlet forming means 14 at one end thereof and gas outlet forming means 16 at the other end thereof. The aforementioned mixture of polytetrafluoroethylene and alkali hydroxide particles is disposed in the container 12 and is designated by the numeral 18.

In one exemplary embodiment of the present invention, a scrubber capable of removing carbon dioxide from an oxygen stream containing 23 parts per million of carbon dioxide to a concentration of less than one-fourth of a part per million for use in a 2.5 kilowatt base electrolyte fuel cell powerplant is 2.2 inches in diameter and 3.7 inches long.

The use of the smaller particles of the alkali hydroxide provides a smaller path through which the gas passes, thereby increasing the likelihood that carbon dioxide will contact the particles and be removed from the gas. Particles between one and 10 microns in size will remove carbon dioxide from a gas stream to a concentration of less than one-fourth of a part per million, and even smaller particles will provide an even lower concentration. The use of these small sized particles increases the carbon dioxide removal performance and increases the utilization of the bed because more surface area is exposed, but it also increases the tendency of the bed to cake due to agglomeration of the particles because of softening of the surfaces of the particles by water in the gas stream. To overcome the caking problem with the small particles and therefore obtain a high performance scrubber that is tolerant to humidified gases, particles of a material that are inert to (that is, do not chemically react with or become softened by) water are mixed into the packed bed to keep the alkali hydroxide particles separated from one another so that they do not cake. These inert particles should be about the same size or smaller than the alkali hydroxide particles in order to be between the alkali hydroxide particles to keep them separated. These inert particles may be hydrophobic in nature to prevent water buildup on the inert particles which may block the gas flow through the bed. Thus, polytetrafluoroethylene is preferred because it is hydrophobic in nature, and it is readily available in suitable form. However, depending on the particular design criteria of any utilization of the invention, various plastics and other inert materials may be used if desired. The hydroxide used in the present invention may be obtained in a form including other materials; for instance, the Indicarb of the foregoing embodiment includes a small amount of asbestos as a support material. On the other hand, hydroxides of varying degrees of purity, without other materials (other than the inert particles of the invention) may be used if desired. Although this invention is particularly useful as a carbon dioxide scrubber for use in the oxidant supply of a fuel cell powerplant, the invention may be used for removing carbon dioxide from the fuel supply of such a powerplant, and it may be used in other applications in which carbon dioxide needs to be removed from a gas stream to concentrations of less then one-fourth of a part per million.

Although the invention has been shown and described with respect to preferred embodiments thereof, it should be understood by those skilled in the art that the foregoing and various other changes, additions and omissions in the form and detail thereof may be made therein, without departing from the spirit and the scope of the invention.

Having thus described typical embodiments of my invention, that which I claim as new and desire to secure by Letters Patent of the U.S. is:

1. A scrubber for removing carbon dioxide from a fuel cell reactant gas stream to a concentration of less than one-quarter of a part per million parts comprising:
   a container including a gas inlet and a gas outlet; and
   a packed bed of particles disposed in said container comprising alkali hydroxide particles no greater than 10 microns in diameter and hydrophobic particles which are inert to water, said hydrophobic particles being of substantially no greater size than said alkali hydroxide particles and being uniformly distributed throughout said alkali hydroxide particles so as to keep a substantial portion of said alkali hydroxide particles separated from one another, said hydrophobic particles comprising between 10 and 60% by volume of said packed bed of particles.

2. The scrubber according to claim 1 wherein said hydrophobic particles comprise polytetrafluoroethylene particles.

3. A scrubber for removing carbon dioxide from a fuel cell reactant gas stream to a concentration of less than one-quarter of a part per million parts comprising:
   a container including a gas inlet and a gas outlet; and
   a packed bed of particles disposed in said container comprising alkali hydroxide particles no greater than 10 microns in diameter and polytetrafluoroethylene particles of substantially no greater size than the alkali hydroxide particles, said polytetrafluoroethylene particles being uniformly distributed throughout said alkali hydroxide particles so as to keep a substantial portion of said alkali hydroxide particles separated from one another, said polytetrafluoroethylene particles comprising between 10 and 60% by volume of said packed bed of particles.

* * * * *